United States Patent [19]

deGeus

[11] 4,081,965
[45] Apr. 4, 1978

[54] SOLAR OPERATED TURBINE POWER GENERATOR

[76] Inventor: Arie M. deGeus, 6625 4th St. South, St. Petersburg, Fla. 33705

[21] Appl. No.: 774,207

[22] Filed: Mar. 3, 1977

[51] Int. Cl.² ............................................. F03G 7/02
[52] U.S. Cl. ......................................... 60/641; 60/682
[58] Field of Search ................ 60/641, 650, 651, 670, 60/671, 682, 695; 290/52, 1 R

[56] References Cited

U.S. PATENT DOCUMENTS

| | | | |
|---|---|---|---|
| 2,691,271 | 10/1954 | McDevitt | 60/650 |
| 3,514,942 | 6/1970 | Kyryluk | 60/641 |
| 4,002,032 | 1/1977 | Bash | 60/641 |

Primary Examiner—Allen M. Ostrager
Assistant Examiner—Stephen F. Husar
Attorney, Agent, or Firm—Dressler, Goldsmith, Clement, Gordon & Shore, Ltd.

[57] ABSTRACT

A solar operated turbine power generator is provided in which air is compressed and supplied to a transparent tube contained within a reflector which concentrates the solar energy upon the tube. The tube is sealed at one end and a tubular collector of radiant heat is positioned concentrically within the tube. The compressed air is supplied to the other end of the tube and is passed through the tube outside of the collector and then back inside of the collector to a turbine which is sealed to the collector. The concentrated radiant energy and the passage of the compressed air through the tube and the collector provide compressed air at the inlet to the turbine at a temperature of at least about 300° C. The compressed hot air is exhausted to atmosphere to drive the turbine and the exhaust is through a heat exchanger which transfers heat to the compressed air at the inlet end of the tube. The turbine drives the compressor and external power generating equipment.

6 Claims, 3 Drawing Figures

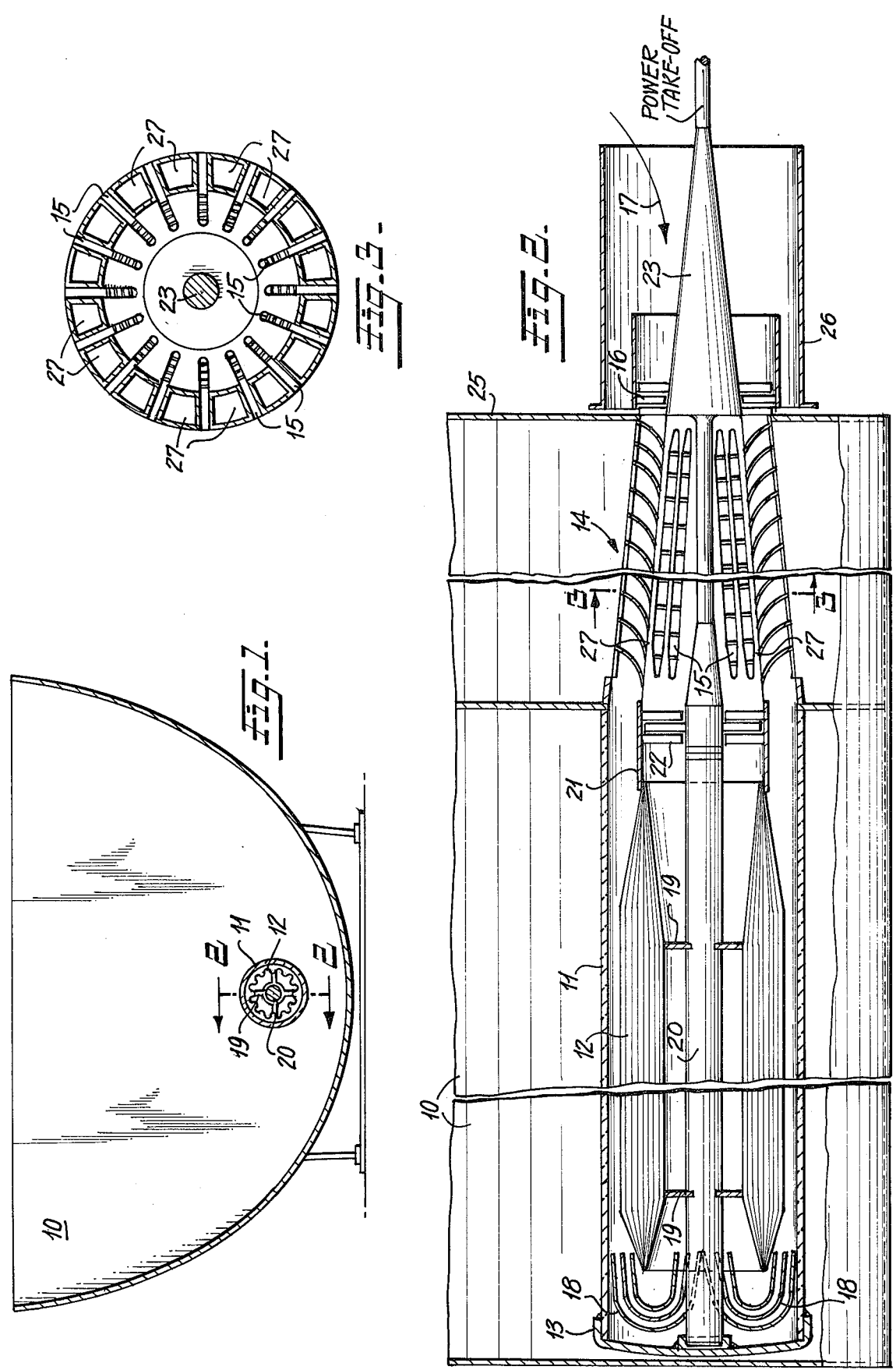

SOLAR OPERATED TURBINE POWER GENERATOR

The present invention relates to solar operated turbine power generators in which air is compressed at one end of a transparent tube containing a tubular collector of radiant heat positioned concentrically within the same and the compressed air is heated by passing the air through the tube outside of the collector and then reversed to pass the air through the tube within the collector and thereby provide heated compressed air to drive a turbine positioned at the inlet end of the tube. The turbine drives the air compressor and auxiliary power equipment and the hot turbine exhaust to atmosphere is discharged in heat exchange relation to the incoming compressed air.

The solar power generating system under consideration relies for part of its efficiency on the recovery of a portion of the heat which remains in the turbine exhaust. In order that this system operate properly, the turbine exhaust gases must be at a high enough temperature to heat the incoming compressed air and this demands a high ratio of solar energy which is collected to the radiant energy collector so as to provide a temperature at the turbine inlet of at least about 300° C. This can be approximated by using a ratio of the diameter of the solar reflector to the diameter of the radiant energy collector of at least about 10:1, and preferably of at least about 15:1. A ratio of up to about 30:1 is quite practical, and higher ratios can be used though these are more difficult to construct and handle and one begins to encounter expenses which may justify closed systems involving low boiling fluids which introduce further efficiencies.

The principal on which the present invention relies is that it takes less energy to compress air at low temperature than the same air can deliver when it is expanded at high temperature. Thus, when solar energy is used to heat the air after it has been compressed, expansion of the heated compressed air will deliver more power than is consumed by the compressor. Curiously, the system of this invention can be somewhat more efficient in the winter time when the atmosphere being compressed is at a lower temperature.

The invention will be more fully understood from the accompanying drawings in which:

FIG. 1 is a diagrammatic cross-sectional sketch showing a parabolic reflector with a tube extending along its focus, said tube containing the solar operated turbine power generator of this invention;

FIG. 2 is a longitudinal cross-section taken through the tube along the line 2—2 of FIG. 1, and showing the limits of the reflector; and FIG. 3 is a cross-section taken through the turbine exhaust and showing the heat exchange section wherein a portion of the thermal energy contained within the turbine exhaust gases is recovered by the compressed inlet air.

Referring more particularly to FIG. 1, 10 identifies a parabolic reflector having a transparent tube 11 positioned at the focus of the reflector. Concentrically positioned within the tube 11 is a tubular heat collector 12. As will be apparent, the reflector 11 concentrates the solar energy upon the tubular heat collector 12 which is preferably constituted by a sheet of corrugated metal which is desirably painted with a heat absorptive coating and welded to itself to form a tube which is open at both ends. The corrugations increase the surface area and this is helpful to increase the heat exchange area, but this is not essential. The reflector may be movable to follow the sun to whatever extent is desired, but this is not an aspect of this invention.

Referring to FIG. 2, it will be seen that tube 11 is closed at one end, in this instance by a cap 13, and the other end is connected to a compressed air inlet 14 which houses exhaust ducts 15 which function as a heat exchanger to transfer some of the residual heat in the turbine exhaust to the compressed air which is introduced into the system. The air inlet 14 is connected to compressor 16.

Following air through the system, atmospheric air is introduced at 17 where it is compressed by compressor 16. In operation, the pressure is raised to the range of 2–5 atmospheres, typically 2.8 atmospheres. Compression raises the temperature from about 25° C. to about 130° C. The compressed air then passes through the compressed air inlet 14, where contact with the exhaust ducts 15 raises the temperature to about 150° C, and thus enters the transparent tube 11 in the annular space between the tube 11 and the tubular collector 12.

The compressed air then passes through the tube 11 in contact with the outside of the collector 12, being heated all the while, and vanes 18 guide the air around the open end of the collector 12 and into the interior of the collector. The vanes 18 reduce frictional losses, but are not essential.

A solid core 20 extends through the interior of the collector 12, being supported at one end by the cap 13. The solid core 20 carries spiders 19 which help to support the collector 12. Contact of the compressed air with the interior of collector 12 serves to maximize the temperature which is obtained at the inlet to the turbine which should be at least about 300° C. in order to obtain reasonable operating efficiency. In typical operation, this temperature is about 330° C.

At the inner end of the collector 12 is a housing 21 which is sealed to the collector 12 to prevent incoming compressed air from being diverted to the turbine 22 before it is fully heated. The turbine 22 is mounted within the housing 21 on a shaft 23 which is secured by means of suitable bearings (not shown) to the core 20. As will also be apparent, compressor 16 is also mounted on the same shaft 23 and this shaft extends further to enable the power generated to be utilized, as for example, for the operation of an electrical generator.

The turbine 22 can be a single stage turbine because of relatively low pressure ratios and this provides good operating efficiency at minimum cost. The turbine exhausts through ducts 15 which serve as heat exchangers as previously described. Typical exhaust temperature is about 155° C. at the exit of the exhaust ducts 15. Appropriate shields 25 and 26 are employed to prevent the heat exhaust gases from reaching the air inlet 17 or heating the compressor 16.

The construction of the exhaust ducts 15 is more fully shown in FIG. 3 where it will be clear that the entering compressed air moves through ducts 27 in heat exchange relationship to the ducts 15.

Reference has been made to typical operation, and this has reference to the use of a parabolic reflector 12 meters in span and 18 meters in length using a glass tube 1 meter in external diameter and a heat collector 70 cms. in mean diameter. Such a unit at the height of a typical summer's day in a temperate zone would generate about 125–130 horsepower.

As will be apparent, the power generator is started whenever adequate solar energy is available by rotating the shaft 23 by hand, or with a starter motor, but start-up procedure is conventional. As soon as the exhaust gases are hot, the power generator produces a surplus of energy, so the external power used for starting may be discontinued. Ordinary starting should be completed in about 30 seconds to 1 minute.

It is stressed that this invention provides a net efficiency in the range of about 10% – 15% under typical operating conditions using a simple structure which employs a turbine and a compressor made of aluminum and there are no low boiling fluids to be contained within the closed system. Maintenance is minimized and the structure operates with little noise and yields no pollutants.

The invention is defined in the claims which follow.

I claim:

1. A solar operated turbine power generator comprising a transparent tube contained within reflective means for concentrating solar energy upon said transparent tube, said tube being sealed at one end and having a tubular collector of radiant heat positioned concentrically within said tube, compressor means for taking air at atmospheric temperature and pressure and supplying it to the other end of said tube at an elevated pressure, said compressed air passing through said tube outside of said tubular collector and then passing back through said tube inside of said tubular collector to a turbine positioned within a housing concentrically positioned within said tube at said other end of said tube and sealed to said tubular collector, whereby said compressed air at the inlet to said turbine within said housing is heated to a temperature of at least about 300° C., exhaust means associated with said turbine for exhausting said heated compressed gases to the atmosphere through said turbine to drive the same, said exhaust means being in heat exchange relation to the compressed air at said other end of said tube so that a portion of the residual heat in the said turbine exhaust is recovered by the incoming air after it has been compressed.

2. A solar operated turbine power generator as recited in claim 1 in which vanes are positioned at the sealed end of said tube to guide the air where its path is reversed.

3. A solar operated turbine power generator as recited in claim 1 in which said turbine is a single stage turbine and the turbine and compressor are mounted on a single shaft.

4. A solar operated turbine power generator as recited in claim 1 in which said collector of radiant heat is constituted by a thin metal sheet convoluted to form a tube with a large heat exchange surface.

5. A solar operated turbine power generator as recited in claim 1 in which said reflective means is constituted by a parabolic reflector, the diameter of said reflector being at least 10 fold greater than the diameter of said tubular collector of radiant heat.

6. A solar operated turbine power generator as recited in claim 5 in which said reflector is from 15–30 fold greater in diameter than the diameter of said tubular collector of radiant heat.

* * * * *